Sept. 19, 1961 J. M. SIPRESS 3,001,155

ACTIVE ONE-PORT NETWORK

Filed July 29, 1960

INVENTOR
J.M. SIPRESS
BY
Ralph T. Holcomb
ATTORNEY

United States Patent Office 3,001,155
Patented Sept. 19, 1961

3,001,155
ACTIVE ONE-PORT NETWORK

Jack M. Sipress, Summit, N.J., assignor to Bell Telephone Laboratories, Incorporated, New York, N.Y., a corporation of New York Filed July 29, 1960, Ser. No. 46,284
2 Claims. (Cl. 333—80)

This invention relates to wave transmission networks and more particularly to an active one-port network having an unrestricted admittance but requiring no inductors.

The object of the invention is to obtain an unrestricted driving-point admittance in a network which requires no inductors but in which all of the component structures may be grounded on one side.

Transmission networks in which the impedance elements include only resistors and capacitors, called RC networks, are advantageous under some circumstances. It is also desirable in some cases that all of the component structures in the network be unbalanced and grounded on one side.

The network in accordance with the present invention meets these requirements. It is an active, one-port network which has an unrestricted admittance but requires no inductors. The structure comprises three two-port component networks connected in tandem to form a closed loop. Each of the component networks may be unbalanced in form and grounded on one side. One is a negative-impedance converter. The other two are passive structures comprising only resistors and capacitors. The unrestricted admittance $Y(p)$ is obtained at a port common to the passive networks.

Two special admittance relationships must apply as follows:

(1) With the common port short-circuited, the admittances looking in both directions at a port of the negative-impedance converter are equal in magnitude but opposite in sign at the frequencies of the poles of $Y(p)$.

(2) With the common port short-circuited, the sum of the admittance looking into the near end of the first passive network facing the common port and the transfer admittance from the near end of the first passive network to the common port is equal in magnitude but opposite in sign to the sum of the admittance looking into the near end of the second passive network and the transfer admittance from the near end of the second passive network to the common port at the frequencies of the zeroes of $Y(p)$.

Figure 1:
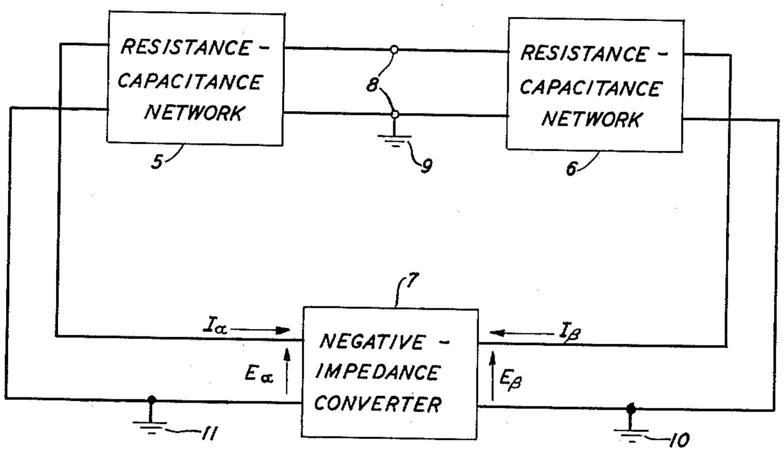
Figure 2:
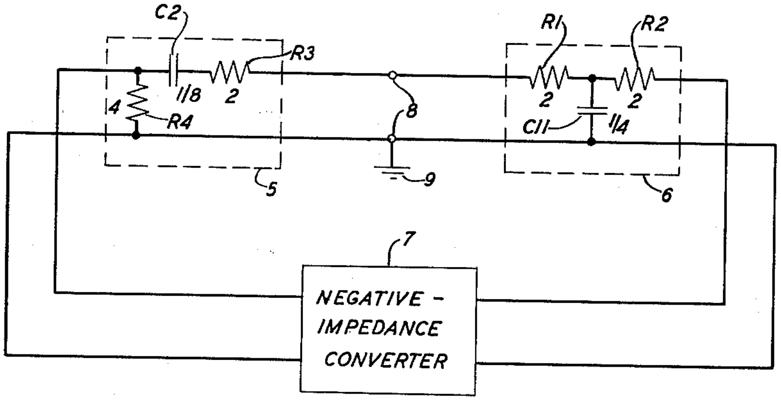

The nature of the invention and its various objects, features, and advantages will appear more fully in the following detailed description of a typical embodiment illustrated in the accompanying drawing, of which FIG. 1 is a block diagram of an unbalanced, active, one-port network in accordance with the invention; and FIG. 2 is a schematic circuit of an embodiment of the network of FIG. 1.

In FIG. 1, three two-port, three-terminal networks 5, 6, and 7 are connected in tandem to form a closed transmission path. The network 7 is a negative-impedance converter having a current transfer ratio $M_i$ and a voltage transfer ratio $M_e$. $M_i$ is the ratio of the right-side current $I_\beta$ to the left-side current $I_\alpha$. $M_e$ is the ratio of the right-side voltage $E_\beta$ to the left-side voltage $E_\alpha$. The assumed directions of these voltages and currents are indicated by the arrows in FIG. 1. In the most useful transistorized negative-impedance converters, $$M_e=M_i=+1$$

The networks 5 and 6 comprise only resistors and capacitors and have a common port 8 with a driving-point admittance $Y(p)$. The structure may be grounded on one side, as shown at the points 9, 10, and 11.

It will now be explained why a network such as shown in FIG. 1 satisfying the special relationships given above can be used to realize an unrestricted admittance. Analysis of the structure yields $$Y(p)=\frac{N(p)}{D(p)}=y_{11a}+y_{11b}-\frac{(y_{12a}+M_e y_{12b})\left(y_{12a}-\frac{1}{M_i}y_{12b}\right)}{y_{22a}-\frac{M_e}{M_i}y_{22b}} \quad (1)$$

where $N(p)$ and $D(p)$ are arbitrary polynominals in the complex frequency variable $p$, with real coefficients; $y_{11a}$ and $y_{22a}$ are the short-circuit driving-point admittances at the right and left ports, respectively, of the network 5; $y_{11b}$ and $y_{22b}$ are the short-circuit driving-point admittances at the left and right ports, respectively, of the network 6; and $y_{12a}$ and $y_{12b}$ are the short-circuit transfer admittances of the networks 5 and 6, respectively. The two special admittance relationships given above are based upon Equation 1.

The various parameters in (1) will now be identified. Assume that the degree of N or the degree of D, whichever is greater, is less than or equal to $m$. Arbitrarily choose $$y_{11a}+y_{11b}=K_1A/B \quad (2)$$

where $A/B$ has the form of an RC driving-point admittance function, A and B are both of degree $m$, A does not equal zero at zero frequency, and $K_1$ is, as yet, undetermined. Hence, $$\frac{(y_{12a}+M_e y_{12b})\left(y_{12a}-\frac{1}{M_i}y_{12b}\right)}{y_{22a}-\frac{M_e}{M_i}y_{22b}}=\frac{K_1AD-NB}{BD} \quad (3)$$

where the degrees of both $K_1AD-NB$ and BD are less than or equal to $2m$. It follows from root-loci considerations and the properties of A and B that a positive value of $K_1$ can be specified such that $$K_1AD-NB=UV \quad (4)$$

where U has only distinct negative real roots and is of degree $m$. In addition, U may be assigned a positive leading coefficient. The degree of V is less than or equal to $m$ and the sign of its leading coefficient is as required by (4).

For a converter in which $M_e$ and $M_i$ are both positive, let $$K_2U=U_a+M_eU_b \quad (5a)$$

$$V=U_a-U_b/M_i \quad (6a)$$

For $M_e$ and $M_i$ both negative, let $$K_2U=U_a-U_b/M_i \quad (5b)$$

$$V=U_a+M_eU_b \quad (6b)$$

where $K_2$ is, as yet, an undetermined positive constant. Consequently, $$U_a=\frac{K_2U/M_i+M_eV}{M_e+1/M_i} \quad (7a)$$

$$U_b=\frac{K_2U-V}{M_e+1/M_i} \quad (8a)$$

for $M_e$ and $M_i$ positive, and $$U_a=\frac{M_eK_2U+V/M_i}{M_e+1/M_i} \quad (7b)$$

$$U_b=\frac{-K_2U+V}{M_e+1/M_i} \quad (8b)$$

for $M_e$ and $M_i$ negative. It follows from root-loci considerations and the properties of U and V that for a large enough value of $K_2$ in both cases both $U_a$ and $U_b$ have only distinct negative real roots, are of degree *m*, and have positive leading coefficients. As a result, and due to the properties of D and B, the parameters on the left-hand side of (3) may be identified as $$y_{12a}=-K_3U_a/B \quad (9)$$

$$y_{12b}=-K_3U_b/B \quad (10)$$

$$y_{22a}-\frac{M_e}{M_i}y_{22b}=K_2K_3^2D/B \quad (11)$$

where $K_3$ is, as yet, an undetermined positive constant.

Next, let $$y_{11a}=K_{1a}A_a/B \quad (12)$$

$$y_{11b}=K_{1b}A_b/B \quad (13)$$

where both $K_{1a}A_a/B$ and $K_{1b}A_b/B$ have the form of RC driving-point admittance functions, $A_a$ and $A_b$ do not equal zero at zero frequency, and $$K_{1a}A_a+K_{1b}A_b=K_1A \quad (14)$$

In (9), (10), and (11) choose the value of $K_3$ such that $y_{12a}$ and $y_{11a}$, given by (9) and (12), respectively, and $y_{12b}$ and $y_{11b}$, given by (10) and (13), respectively, can be realized in ladder-type structures. See, for example, page 101 of the book by J. G. Truxal entitled "Automatic Feedback Control System Synthesis," published in 1955 by McGraw-Hill Book Company, Incorporated, New York. Synthesize these two structures without regard for the resulting $y_{22}$'s, which will be denoted $y_{22a}'$ and $y_{22b}'$, respectively. Let $$y_{22a}=y_{22a}'+y_3 \quad (15)$$

$$y_{22b}=y_{22b}'+y_4 \quad (16)$$

where $y_3$ and $y_4$ are each two-terminal admittances comprising only resistors and capacitors. Hence, $$y_{22a}'+y_3-\frac{M_e}{M_i}(y_{22b}'+y_4)=K_2K_3^2D/B \quad (17)$$

The admittances $y_3$ and $y_4$ can be determined from (17) by expanding $$\frac{1}{p}\left(K_2K_3^2D/B-y_{22a}'+\frac{M_e}{M_i}y_{22b}'\right)$$

in partial fractions. The sum of the terms with positive residues can be identified as $y_3/p$ while the sum of the terms with negative residues can be identified as $$\frac{M_ey_4}{M_ip}$$

As a specific embodiment of the invention, consider the realization of $Y(p)=1/p$. Assume that, in the negative-impedance converter 5, $M_e=M_i=1$. Choose $$y_{11a}+y_{11b}=K_1\frac{p+1}{p+4} \quad (18)$$

The choice of $K_1=1$ gives $U=p+2$, $V=p-2$. Thus, the choice of $K_2=1$ yields $U_a=p$ and $U_b=2$. Hence, $$y_{12a}=-K_3p/(p+4) \quad (19)$$

$$y_{12b}=-2K_3/(p+4) \quad (20)$$

The above choice of $K_2$ results in expressions for $U_a$ and $U_b$ that are somewhat simplified. This allows the choice of $$y_{11a}=K_3p/(p+4) \quad (21)$$

$$y_{11b}=\frac{(1-K_3)p+1}{p+4} \quad (22)$$

With $K_3=\frac{1}{2}$, the network 6 will be constituted by two series resistors R1 and R2 and an interposed shunt capacitor C1, as shown in FIG. 2. The series arm of the network 5 is also now determined. As shown, it is made up of a capacitor C2 and a resistor R3 connected in series. Hence, $$y_{22a}'=\frac{p/2}{p+4} \quad (23)$$

$$y_{22b}'=\frac{p/2+1}{p+4} \quad (24)$$

Also, $$(y_{22a}'+y_3)-(y_{22b}'+y_4)=K_3^2p/(p+4)=\frac{p/4}{p+4} \quad (25)$$

giving $$y_3=\tfrac{1}{4} \quad (26)$$

$$y_4=0 \quad (27)$$

In the network 5, the shunt resistor R4 represents $y_3$. Since $y_4$ is zero, no additional shunt branch is required in the network 6.

In this example, the values of the resistors in ohms and the capacitors in farads are as follows:

R1=2.000
R2=2.000
R3=2.000
R4=4.000
C1=0.250
C2=0.125

It is to be understood that the above-described arrangement is only illustrative of the application of the principles of the invention. Numerous other arrangements may be devised by those skilled in the art without departing from the spirit and scope of the invention.

What is claimed is:

1. An active one-port network with unrestricted driving-point admittance Y comprising three two-port, three-terminal, wave transmission networks connected in tandem to form a transmission loop, one of the networks being a negative-impedance converter, the other two networks being passive, having a common port, and comprising only resistors and capacitors, and when the common port is short-circuited the admittances looking in both directions at a port of the converter being equal in magnitude but opposite in sign at the frequencies of the poles of Y and the sum of the admittance looking into the near end of the first passive network facing the common port and the transfer admittance from the near end of the first passive network to the common port being equal in magnitude but opposite in sign to the sum of the admittance looking into the near end of the second passive network and the transfer admittance from the near end of the second passive network to the common port at the frequencies of the zeroes of Y.

2. An active wave transmission structure having an unrestricted driving-point admittance Y but requiring no inductors comprising three two-port networks connected in tandem to constitute a closed transmission path, one of the networks being a negative-impedance converter which may be grounded on one side, the other two networks being passive, unbalanced in form, and made up of resistors and capacitors only, the admittance Y appearing at a port common to the passive networks, and when the common port is short-circuited the admittances looking in both directions at a port of the converter being equal in magnitude but opposite in sign at the frequencies of the poles of Y and the sum of the admittance looking into the near end of the first passive network facing the common port and the transfer admittance from the near end of the first passive network to the common port being equal in magnitude but opposite in sign to the sum of the admittance looking into the near end of the second passive network and the transfer admittance from the near end of the second passive network to the common port at the frequencies of the zeroes of Y.

No references cited.